Patented Sept. 9, 1952

2,610,110

UNITED STATES PATENT OFFICE 2,610,110

METHOD OF PRODUCING FINELY CRYSTALLINE ALUMINUM OXIDE

Bror Eliasson, Eskilstuna, Sweden

No Drawing. Application April 28, 1949, Serial No. 90,273. In Sweden April 30, 1948

10 Claims. (Cl. 23—300)

The present invention relates to a method of producing finely crystalline aluminum oxide having improved physical properties adapting it for use particularly as a grinding agent or abrasive material for making machine parts which require high precision finishing, as well as for use in connection with the production of metallic aluminum and other technical uses.

Heretofore aluminum oxide has been produced either by calcining or by melting in an electric furnace naturally occurring or artifically produced hydrated aluminum oxides such as bauxite and the like.

The conventional commercial product which has been produced by calcination is used primarily in connection with the production of metallic aluminum but its uneven physical characteristics, its coarse crystalline structure and its pronounced tendency to form large lumps or agglomerations cause difficulty not only in the production of aluminum but deleteriously affect the outstanding abrasive properties of the aluminum oxide which, otherwise, make it particularly advantageous as an abrasive.

The aluminum oxide produced by melting in the electric furnace must be ground and more or less finely pulverized in order to render it effective as a grinding agent. However, the pulverizing operation generally results in the formation of extremely uneven grinding surfaces in the pulverized particles, which effect militates against the advantageous use of the material as an abrasive or grinding agent.

According to the present invention the aforementioned disadvantages have been eliminated to a remarkable degree and an aluminum oxide composed of very fine and well-formed crystals has been obtained by using as a base material artificially made hydrated aluminum oxides or naturally occurring hydrated aluminum oxides, such as bauxite and the like. This base material should be as free as possible of alkali and as finely pulverized as possible. To the base material is added certain agents or substances, which during the following calcination favorably affect crystal growth. These substances may be added before, after or simultaneously with a sufficiently extended pulverizing or grinding operation in dry condition or even in wet condition in which latter case most of the liquid is removed in some manner, for example by centrifuging, before the final calcination. When the pulverizing is performed in a wet condition and most of the liquid is removed, the base material can be dried up to a temperature of about 400° C. The substance favorably affecting the crystal growth is then added and thoroughly incorporated with the base material, and the mixture pulverized before the calcining process. The pulverizing of the base material or the mixture of the base material and the additive can be performed, depending upon conditions, either wet or dry, and when it is practical to do a preliminary drying operation at a temperature up to approximately 400° C., before the final calcining operation, the pulverizing can be done either before or after the drying operation. Or it can partly be done before, partly after the drying operation. As such additives, phosphorus-containing compounds such as phosphoric acid, phosphorus pentoxide, and various ammonium phosphates and the like have been found to be particularly effective. These additives, however, should be substantially free of alkali. These additives have such as favorable effect upon the formation of crystals that is many cases the preliminary pulverizing operation which is performed before calcination, does not have to be carried out to as great an extent as when such additives are not employed, and may even be completely eliminated depending upon the degree of fineness of the starting or base material and the desired characteristics of the final product. The foregoing is especially true where an already somewhat comminuted hydrated aluminum oxide or the like is used as a base material. The calcining operation takes place at a temperature of approximately 1000 to 1300° C. during a period ranging between one to five hours. The aluminum oxide thus obtained consists of a fine powder of very small, well developed crystals that do not stick together and can be stored for an indefinite time. As an abrasive it can be used as is, which of course does not prevent its being further pulverized for certain specific uses.

The amount of additives may of course be varied depending upon the desired characteristics of the final product, the properties of which will be influenced by the temperature and time of calcination. Amounts of additive ranging up to 10% by weight with respect to the aluminum oxide content of the base material have given particularly good results and variations within this range make it possible to vary the characteristics of the final product.

By the practice of the present invention aluminum oxide having very fine crystalline structure may be obtained. Furthermore the degree of fineness of the crystals may be varied in order to impart different characteristics to the final product and this is of particular significance where the product is to be employed as an abrasive or grinding material. It will be noted that the polishing or grinding materials composed of aluminum oxide produced according to the present invention possess a polishing or grinding effect much greater than that of the substances which have been heretofore available on the market. Furthermore, the fine crystalline structure naturally enhances the applicability of the product for other purposes.

*Example 1*

Finely crystalline hydrated aluminum oxide (bauxite) which is as free as possible of alkali is pulverized to as fine a condition as possible either in dry or wet condition and is then dried to constant weight (if necessary, having first removed the liquid as by centrifuging) at a temperature of from 200°–300° C., preferably about 230° C.

To the above described finely pulverized (and if necessary dried) product is added about 7% by weight of finely pulverized diammonium phosphate, whereafter the mixture is further pulverized.

The finely pulverized mixture is then calcined at a temperature of about 1000°–1300° C., preferably approximately 1120° C., and is kept at this temperature for about four hours. The oxide is thereafter cooled and is ready after a slight crushing operation.

*Example 2*

Hydrated aluminum oxide as free as possible of alkali is pulverized as fine as possible in a wet condition. Most of the excess water is now siphoned off, and after analysis is made of the aluminum oxide content of the mixture, phosphoric acid (85% by weight) is added in a quantity corresponding to 4.5% by weight of the aluminum oxide content of the mixture. The phosphoric acid is well mixed with the hydrated aluminum oxide slurry.

The mixture is now fed into the cooler end of a revolving oil fired furnace and gradually heated until a temperature of 1140° C. is reached, at which temperature the mixture is kept for five hours. The oxide is thereafter cooled and is now ready.

*Example 3*

Hydrated aluminum oxide as free as possible of alkali is pulverized as fine as possible in a wet condition. Most of the excess water is now siphoned off and after analysis is made of the aluminum oxide content of the mixture, phosphoric acid (85% by weight) is added in a quantity corresponding to 4.5% by weight of the aluminum oxide content of the mixture. The phosphoric acid is well mixed with the hydrated aluminum oxide slurry. The mixture is then dried to constant weight at a temperature of from 200–400° C., again pulverized and then calcined at a temperature of 1140° C. for five hours.

*Example 4*

Hydrated aluminum oxide as free as possible of alkali is pulverized as fine as possible in a wet condition and is then put through a filter press to eliminate most of the water. The product is now dried to constant weight at a temperature of from 200–400° C., 3.3% by weight phosphorus-pentoxide (figured on the aluminum oxide content of the dry product) is now added and well mixed in. The mixture is again finely pulverized and then calcined at a temperature of 1140° C. for five hours.

Drying to constant weight may under certain circumstances also be carried out simultaneously with the comminution process.

As has been previously pointed out phosphoric acid, phosphorus pentoxide, various other ammonium phosphates than the one disclosed in the samples and other phosphorus containing compounds are also suitable as additives in the process of the present invention.

Since certain modifications may be made in the process of the present invention without departing from the scope thereof, it is intended that all matter contained in the foregoing specification be interpreted merely as illustrative and not in a limiting sense.

What is claimed is:

1. Method of producing finely crystalline aluminum oxide which comprises adding to a finely pulverized base material consisting of substantially alkali-free hydrated aluminum oxide an additive selected from a group consisting of phosphoric acid, phosphorus pentoxide and ammonium phosphates, pulverizing the mixture and calcining the mixture at a temperature of from 1000°–1300° C. for a period from one to five hours.

2. Method of producing finely crystalline aluminum oxide which comprises adding to a finely pulverized base material consisting of substantially alkali-free bauxite an additive selected from a group consisting of phosphoric acid, phosphorus pentoxide and ammonium phosphates, pulverizing the mixture and calcining the mixture at a temperature of from 1000°–1300° C. for a period of from one to five hours.

3. Method of producing finely crystalline aluminum oxide which comprises adding to a finely pulverized base material consisting of substantially alkali-free hydrated aluminum oxide up to 10% of an additive selected from a group consisting of phosphoric acid, phosphorus pentoxide and ammonium phosphates, pulverizing the mixture and calcining the mixture at a temperature of from 1000°–1300° C. for a period of from one to five hours.

4. Method of producing finely crystalline aluminum oxide which comprises adding to a finely pulverized base material consisting of substantially alkali-free hydrated aluminum oxide an additive selected from a group consisting of phosphoric acid, phosphorus pentoxide and ammonium phosphates, mixing, drying the mixture to a constant weight at a temperature up to approximately 400° C. producing a partially dehydrated alumina, pulverizing the partially dehydrated mixture and calcining the mixture at a temperature of from 1000°–1300° C. for a period of from one to five hours.

5. Method of producing finely crystalline aluminum oxide which comprises adding to a finely pulverized base material consisting of substantially alkali-free bauxite up to 10% of diammonium phosphate as an additive promoting crystal formation, pulverizing the mixture, and calcining the mixture at a temperature of from 1000°–1300° C. for a period of from one to five hours.

6. Method of producing finely crystalline aluminum oxide which comprises adding to finely pulverized base material consisting of substantially alkali-free hydrated aluminum oxide up to 10% of diammonium phosphate as an additive promoting crystal formation, pulverizing the mixture, and calcining the mixture at a temperature of from 1000°–1300° C. for a period of from one to five hours.

7. Method of producing finely crystalline aluminum oxide which comprises adding to a finely pulverized base material consisting of substantially alkali-free bauxite up to 10% of diammonium phosphate as an additive promoting crystal formation, mixing, drying the mixture to constant weight at a temperature up to approximately 400° C. producing a partially dehydrated alumina, pulverizing the partially dehydrated mixture and calcining the mixture at a temperature of from 1000°–1300° C. for a period of from one to five hours.

8. Method of producing finely crystalline aluminum oxide which comprises adding to a finely pulverized base material consisting of substantially alkali-free hydrated aluminum oxide up to 10% by weight of phosphoric acid, mixing, pulverizing the mixture, and calcining the mixture at a temperature of from 1000°–1300° C. for a period of from one to five hours.

9. Method of producing finely crystalline aluminum oxide which comprises adding to finely pulverized base material consisting of substantially alkali-free hydrated aluminum oxide up to 10% of phosphorous pentoxide as an additive promoting crystal formation, pulverizing the mixture, and calcining the mixture at a temperature of from 1000°–1300° C. for a period of from one to five hours.

10. Method of producing finely crystalline aluminum oxide which comprises adding to a finely pulverized base material consisting of substantially alkali-free hydrated aluminum oxide up to 10% of phosphorus pentoxide as an additive promoting crystal formation, mixing, drying the mixture to constant weight at a temperature up to approximately 400° C. producing a partially dehydrated alumina, pulverizing the partially dehydrated mixture, and calcining the mixture at a temperature of from 1000°–1300° C. for a period of from one to five hours.

BROR ELIASSON.

REFERENCES CITED

The following references are of record in the file of this patent:

UNITED STATES PATENTS

| Number | Name | Date |
|---|---|---|
| 1,949,038 | Craven | Feb. 27, 1934 |

OTHER REFERENCES

Lange, "Handbook of Chemistry," Handbook Publishers Inc., 6th Ed., 1946, page 160.